United States Patent Office 3,501,460
Patented Mar. 17, 1970

3,501,460
DEHYDRATION PROCESS FOR FORMING
BENZODIAZEPINES
Hans Heinrich Kaegi, Passaic, N.J., assignor to Hoffmann-
La Roche Inc., Nutley, N.J., a corporation of New
Jersey
No Drawing. Filed June 3, 1966, Ser. No. 554,964
Int. Cl. C07d 53/06
U.S. Cl. 260—239          11 Claims

ABSTRACT OF THE DISCLOSURE

Process for preparing 1-lower alkyl-2,3-dihydro-1,4-benzodiazepines involving dehydrating a N-(phenyl)-N-lower alkyl-N'-benzoylethylenediamine.

DETAILED DESCRIPTION OF THE INVENTION

The present invention relates to novel chemical processes. More particularly, the present invention relates to novel chemical processes for preparing known compounds useful as pharmacological agents by virtue of their pharmaceutical activity and to novel intermediates useful in such preparative techniques.

The aforementioned known compounds which result from a performance of the novel processes disclosed in the subject application can be characterized broadly in a chemical sense as 1-lower alkyl-2,3-dihydro-5-phenyl-1,4-benzodiazepines and are of the formula

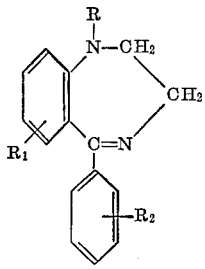

wherein R is lower alkyl; $R_1$ is selected from the group consisting of chlorine, bromine, nitro, trifluoromethyl and hydrogen and; $R_2$ is selected from the group consisting of hydrogen and halogen.

An especially medicinally valuable class of compounds within the genus encompassed by Formula I above is the one wherein $R_2$ is hydrogen and $R_1$ is halogen. Especially preferred is a compound of the Formula I above wherein R is methyl, $R_1$ is chlorine and $R_2$ is hydrogen, i.e. 7 - chloro - 2,3 - dihydro - 1 - methyl - 5 - phenyl - 1H-1,4-benzodiazepine.

Preparative techniques for obtaining compounds of the Formula I above have been known heretofore. The process of the present invention is an improvement over such known preparative techniques due to the fact that it utilizes materials readily and inexpensively available and is simple to effect.

The said process for preparing compounds of the Formula I above involves in its first stage treating an N-lower alkyl substituted-aniline of the formula

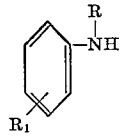

wherein R and $R_1$ are as above; with ethyleneimine in the presence of an aprotic Lewis acid, such as, for example, boron trifluoride, titanium tetrachloride, aluminum chloride and the like (preferentially aluminum chloride), and an inert organic solvent, for example, a hydrocarbon such as benzene, toluene and the like, whereby to prepare a compound of the formula

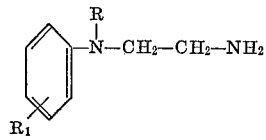

wherein R and $R_1$ are as above.

While temperature is not a critical aspect of the first stage of the process of the present invention, elevated temperatures are preferred when reacting a compound of the Formula II above with ethyleneimine, e.g. preferably at about the reflux temperature of the reaction medium. The compounds having the Formula III above wherein $R_1$ is other than hydrogen are novel compounds, are useful in the method described herein and, hence, constitute a part of the present invention.

In the second stage of the process of the present invention, compounds of the Formula III above are reacted with a benzoyl halide of the formula

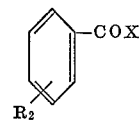

wherein $R_2$ is as above and X is any suitable leaving group; in the presence of an inert organic solvent whereby to prepare a compound of the formula

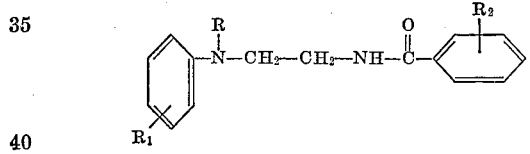

wherein R, $R_1$ and $R_2$ are as above.

Any suitable leaving group which will function efficaciously for the purposes of the present invention is included within the purview thereof. In the most advantageous aspect, bromine or chlorine is utilized as the leaving group and thus, X is advantageously selected from the group consisting of chlorine and bromine. However, any appropriate activating leaving groups such as other members of the halogen family and acyl or the like can be utilized. (Such species can be generated in situ from an appropriate acid, i.e. X=OH, with such an agent as dialkyl-carbodiimides, n-toluenesulfonyl halides, etc.) As should be evident from the above, all that is required of the leaving group is that it be suitable for the purposes of the present invention, that is, that it permit formation of the compound of the Formula IV above. In one aspect, an acid acceptor is present when converting a compound of the Formula III above to a compound of the Formula IV above. If an acid acceptor is utilized, an excess of the acid acceptor can be provided whereby it can also serve as the medium in which the reaction is effected. By this simple expedient, there can be provided to the reaction zone a single substance which can serve a two-fold purpose, i.e., as acid acceptor and reaction medium. Any suitable acid acceptor which will function efficaciously for the purposes of the present invention is contemplated. Especially preferred are tertiary amines, e.g. pyridine and the like. However, the reaction is preferably run in an inert organic solvent without having an acid acceptor additive present. Representative of inert organic solvents usable in this preferred process variation are aromatic hydrocarbons such as benzene, toluene and the like, halogenated aromatic hydrocarbons such as chlorobenzene or the like and any other suitable inert organic solvent. While temperature and pressure are not critical aspects in this process step, it is preferred to effect this stage of the process of the present invention at about room temperature.

In the final process step, the so-formed compounds of the Formula IV above are dehydrated whereby cyclization to the desired compounds of the Formula I above occurs. The cyclization is effective with any dehydrating agent capable of effecting this end. Among the many dehydrating agents suitable for the purposes of the present invention may be included phosphorus pentoxide, phosphorus oxychloride, condensed phosphoric acid and the like and mixtures thereof. In a particularly advantageous process variation of the present invention, a dehydrating system comprising essentially phosphorus oxychloride and phosphorus pentoxide are employed, preferably containing the former in a molar amount greater than 50% of the total molar amount of these two ingredients. The last stage of the process aspect, i.e. the dehydration of the compound of the Formula IV above to the corresponding compound of the Formula I above, proceeds preferably at elevated temperatures, e.g., at a temperature range from about 50 to about 120° C.

Compounds of the Formulas III and IV above wherein $R_1$ is other than hydrogen are novel, are useful in the preparation of the pharmaceutically valuable compounds of the Formula I above and hence, constitute a part of the present invention.

The term "halogen" as utilized herein is intended to connote all four forms thereof, i.e. chlorine, bromine, iodine and fluorine, unless otherwise specified. The term "lower alkyl" as utilized herein is intended to represent a straight or branched chain hydrocarbon group such as methyl, ethyl, propyl, isopropyl, butyl, isobutyl and the like. Preferred are lower alkyl groupings containing 1–4 carbon atoms. When the term "para" is utilized herein in connection with the intermediates above, e.g. the intermediates of Formulas II–IV, the position para to the nitrogen atom attached to the phenyl ring is intended.

The present invention provides a process which is eminently well suited for commercial application since there results from the performance thereof, the desired compounds of the Formula I above in good yields and of high quality. Furthermore, the various reactants employed when proceeding along the reaction path described above are readily and inexpensively available in commerce, thereby increasing the desirability of the process included within the purview of the present invention from a commercial point of view.

The foregoing is a description of the main synthetic route to the compounds of the Formula I above. It will be readily apparent to those skilled in the art that variations in these preparative techniques are possible.

The following examples are illustrative but not limitative of the present invention. All temperatures stated therein are in degrees centrigrade.

Example 1

A mixture of 63.8 g. (0.5 M) of p-chloro aniline and 114 g. (0.6 M) of p-toluenesulfonyl chloride in 400 ml. of pyridine was stirred at room temperature overnight. Most of the pyridine was then removed in vacuo. The residue was poured into 2 l. of ice-water and the tosylate extracted with ether. The ether was extracted with 1 N sodium hydroxide, aqueous hydrochloric acid, water, dried over magnesium sulfate and concentrated. The resulting oil was crystallized from ether, yielding tosylamido-4-chlorobenzene, M.P. 119.5–120.5°.

Example 2

A mixture of 70.4 g. (0.25 M) of tosylamido-4-chlorobenzene, 700 ml. toluene and 0.3 mole of sodium methoxide in 200 ml. of methanol was stirred and refluxed for 1 hour. After distilling off most of the methanol, 47.3 ml. (0.5 M) of dimethyl sulfate was added. The stirring and refluxing was then continued for 5 additional hours. The precipitated sodium salt disappeared slowly. Excess dimethyl sulfate was destroyed by refluxing an additional 1½ hours with 400 ml. of 3 N sodium hydroxide. The phases were separated and the toluene distilled off leaving a white crystalline residue. Recrystallization from ethanol gave N-methyl-tosylamido-4-chlorobenzene, M.P. 92–93°.

Example 3

61.5 g. (0.208 M) of N-methyl-tosylamido-4-chlorobenzene were to added to 580 ml. of sulfuric acid (spec. gravity 1.74) at 105°. The mixture was stirred, heated up to 145° and kept at that temperature for 1 hour. After cooling, the solution was made strongly alkaline with 50% sodium hydroxide and the organic base extracted with ether. The organic extract was dried over potassium hydroxide pellets, concentrated and the residue distilled in vacuo to yield p-chloro-N-methylaniline, B.P. 74–75° at 0.7 mm. Hg.

Example 4

To 13.3 g. of aluminum chloride and 20 ml. of dry benzene, in a 50 ml. three-neck flask equipped with reflux condenser, dropping funnel and stirrer, there was added 14.1 g. (0.1 M) of p-chloro-N-methylaniline, carefully and with cooling. After complete addition, the mixture was heated until reflux commenced and kept at that temperature for a short period. Freshly distilled ethyleneimine (4.3 g., 0.1 M) was then slowly distilled into the reaction vessel from a small flask attached to the former with a gas-inlet-tube by heating the flask. After the addition was complete, the reaction mixture was stirred for another thirty minutes and then poured on 200 g. of ice contained in a one-liter flask fitted with a condenser. Solid potassium hydroxide, 50 g., was added to the resulting solid in small portions, and the material was observed to go into solution. It was then cooled and extracted three times with benzene. The combined benzene extracts were dried over potassium hydroxide pellets and concentrated. The residue was distilled in vacuo through a ten-cm. Vigreux column yielding N-(p-chlorophenyl)-N-methyl-ethylenediamine, B.P. 126–127° at 0.05 mm. Hg.

Example 5

A mixture of 3.69 g. (20 mM.) of N-(p-chlorophenyl)-N-methyl-ethylenediamine and 2,18 ml. of benzoyl chloride in 10 ml. of dry pyridine was allowed to stand at room temperature overnight. The reaction mixture was dissolved in ether and extracted once with 3 N sodium hydroxide and then three times with water. The organic phase was dried with sodium sulfate, concentrated and most of the pyridine removed in vacuo. Recrystallization of the reddish-brown residue from ethanol-water gave N - (p-chlorophenyl) - N - methyl-N'-benzoyl-ethylenediamine, M.P. 102–103°.

Later runs showed that the last-mentioned compound was more suitably prepared by refluxing benzoyl chloride and N - (p - chlorophenyl) - N - methyl - ethylenediamine in benzene. The isolated, crude N - (p - chlorophenyl)-N - methyl - N' - benzoyl - ethylene diamine was found to be pure enough to be used directly in preparing 7-chloro - 2,3 - dihydro - 1 - methyl - 5 - phenyl - 1H - 1,4-benzodiazepine in a manner analogous to that described in Example 6.

Example 6

N - (p-chlorophenyl) - N - methyl - N' - benzoyl-ethylenediamine (288 mg., 1 mM.), 1.42 g. (10 mM.) of phosphorous pentoxide and 4 ml. (43 mM.) of phosphorus oxychloride were stirred at 110° for seventeen hours. The reaction mixture was cooled and treated with 25 g. of ice and 25 ml. of 4 N hydrochloric acid. The solution was extracted with ester and made basic with 10 N sodium hydroxide. The organic free base was then extracted with methylene chloride and the extract dried. Removal of the solvent gave 7-chloro-2,3-dihydro-1-methyl-5-phenyl-1H-1,4-benzodiazepine as a yellow oil which was dissolved in 2 ml. of methanol. Methanol, 0.7 ml., containing 1.05 mM. of hydrochloric acid, was added, and crystallization was induced by adding ether yielding 7-chloro-2,3-dihydro - 1 - methyl - 5 - phenyl-1H-1,4-benzodiazepine hydrochloride, M.P. 250–252°.

Example 7

288 mg. (1 mM.) of N-(p-chlorophenyl)-N-methyl-N'-benzoyl-ethylene diamine was refluxed with 1 ml. of phosphorus oxychloride for 7 hours. The reaction mixture was then evaporated to dryness in vacuo and the residue dissolved in ice-cold 3 N hydrochloric acid. The acidic solution was extracted once with ether, made basic with 5 N sodium hydroxide and the product extracted 3 times with methylene dichloride. After drying the extracts and evaporating to remove the solvent, the residue was dissolved in 5 ml. of methanol. To the solution was added 0.4 ml. of methanol containing 0.64 mM. of hydrochloric acid. Upon the addition of ether, 7-chloro-2,3 - dihydro - 1 - methyl - 5 - phenyl -1H - 1,4 - benzodiazepine hydrochloride, M.P. 250–252° precipitated.

I claim:

1. A process for the preparation of a 1,4-benzodiazepine of the formula

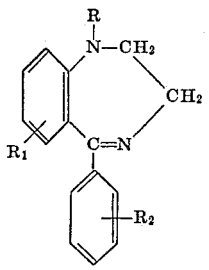

I wherein R is selected from the group consisting of lower alkyl; $R_1$ is selected from the group consisting of hydrogen, trifluoromethyl, nitro, chlorine and bromine and $R_2$ is selected from the group consisting of hydrogen and halogen; which comprises reacting a compound of the formula

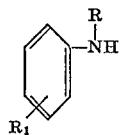

II wherein R and $R_1$ are as above; with ethyleneimine in the presence of an aprotic Lewis acid and an inert organic solvent whereby to prepare a compound of the formula

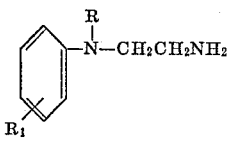

III wherein R and $R_1$ are as above; and treating the so-formed last-mentioned compound with a compound of the formula

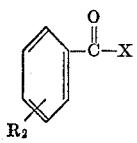

IV wherein X is any suitable leaving group selected from the group consisting of chlorine and bromine and $R_2$ is as above whereby to prepare the corresponding compound of the formula

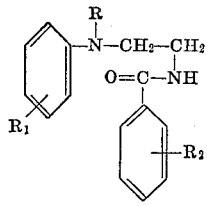

V wherein R, $R_1$ and $R_2$ are as above and dehydrating at elevated temperatures the last-mentioned compound with a dehydration system whereby to effect ring closure to the 1,4-benzodiazepine whose formula is illustrated above.

2. A process as defined in claim 1 wherein the said dehydrating system comprises essentially phosphorus pentoxide and phosphorus oxychloride.

3. A process as defined in claim 1 wherein the aprotic Lewis acid utilized is aluminum chloride.

4. A process as defined in claim 1 wherein $R_1$ is chlorine and is joined to the phenyl ring of the compounds of the Formulas II–V in the para position thereof and to the compound of the Formula I in position-7, R is methyl and $R_2$ is hydrogen.

5. A process as defined in claim 4 wherein the dehydrating system utilized comprises essentially phosphorus pentoxide and phosphorus oxychloride.

6. A process as defined in claim 5 wherein the aprotic Lewis acid utilized is aluminum chloride.

7. A process which comprises dehydrating a compound of the formula

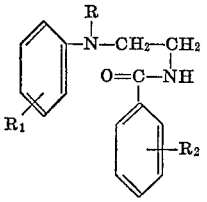

I wherein R is selected from the group consisting of lower alkyl, $R_1$ is selected from the group consisting of hydrogen, chlorine, bromine, nitro and trifluoromethyl and $R_2$ is selected from the group consisting of hydrogen and halogen; with a dehydrating system at an elevated temperature whereby to prepare a compound of the formula

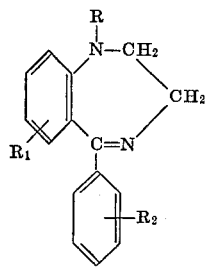

II wherein R, $R_1$ and $R_2$ are as above.

8. A process as defined in claim 7 wherein $R_1$ is chlorine, R is methyl and $R_2$ is hydrogen, $R_1$ being joined to the intermediate of the Formula I in the para position of the phenyl ring thereof and to the end product of the Formula II in position-7 thereof.

9. A process as defined in claim 8 wherein the dehydrating system comprises essentially phosphorus pentoxide and phosphorus oxychloride.

10. A process as recited in claim 1 wherein the the dehydrating system comprises a member selected from the group consisting of phosphorus pentoxide, phosphorus oxychloride, phosphoric acid and mixtures thereof.

11. A process as recited in claim 7 wherein the dehydrating system comprises a member selected from the group consisting of phosphorus pentoxide, phosphorus oxychloride, phosphoric acid and mixtures thereof.

References Cited

Hicks et al., Proc. Iowa Acad. Sci., vol. 23, pp. 207–209 (1946).

Villani et al., J. Am. Chem. Soc., vol. 72, pp. 2724–2727 (1950).

ALTON D. ROLLINS, Primary Examiner

U.S. Cl. X.R.

260—556, 558, 570.5